US012705998B2

(12) United States Patent
Kurani et al.

(10) Patent No.: US 12,705,998 B2
(45) Date of Patent: Aug. 11, 2026

(54) SYSTEMS AND METHODS FOR AN EDUCATIONAL GENERATIVE ARTIFICIAL INTELLIGENCE MODEL

(71) Applicant: Wells Fargo Bank, N.A., San Francisco, CA (US)

(72) Inventors: Ashish B. Kurani, Hillsborough, CA (US); Azita Asefi, Vacaville, CA (US); Alan W. Hecht, Chanhassen, MN (US); Traci Nguyen, San Francisco, CA (US); Darrell Lee Suen, San Ramon, CA (US); Dennis E. Montenegro, Concord, CA (US); Julio Jiron, San Bruno, CA (US); Darius A. Miranda, San Francisco, CA (US); Muhammad Farukh Munir, Pittsburg, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 268 days.

(21) Appl. No.: 18/395,894

(22) Filed: Dec. 26, 2023

(65) Prior Publication Data

US 2025/0209933 A1 Jun. 26, 2025

(51) Int. Cl.
*G09B 7/04* (2006.01)
*G06N 3/0475* (2023.01)

(52) U.S. Cl.
CPC ............. *G09B 7/04* (2013.01); *G06N 3/0475* (2023.01)

(58) Field of Classification Search
CPC ................................ G09B 7/04; G06N 3/0475
See application file for complete search history.

(56) References Cited

U.S. PATENT DOCUMENTS

| | | | | |
|---|---|---|---|---|
| 11,444,893 | B1 * | 9/2022 | Kalluri | G10L 15/22 |
| 11,699,030 | B1 * | 7/2023 | Burd | G06F 40/174 715/222 |
| 2017/0206797 | A1 | 7/2017 | Solomon et al. | |

(Continued)

OTHER PUBLICATIONS

ELSA News; Introducing ELSA Voice AI Tutor Featuring Generative AI; https://blog.elsaspeak.com/en/elsa-voice-ai-tutor-generative-ai/; Apr. 4, 2023; 8 Pages.

(Continued)

*Primary Examiner* — Dmitry Suhol
*Assistant Examiner* — Alyssa N Brandley
(74) *Attorney, Agent, or Firm* — Foley & Lardner LLP

(57) ABSTRACT

A provider computing system includes a processing circuit having at least one processor coupled to at least one memory device and at least one artificial intelligence (AI) system. The processing circuit performs operations including retrieving first data from one or more data sources associated with a user; generating a model associated with the user based on the first data; and receiving, from a client computing device of the user, a query for information relating to a primary topic. The at least one AI system is configured to perform operations including generating a user knowledge dataset relating to the primary topic; determining one or more prompts according to the user knowledge dataset; presenting, via the client computing device, the one or more prompts to the user; and receiving, via the client computing device, a response to the one or more prompts from the user.

18 Claims, 6 Drawing Sheets

300

(56) References Cited

U.S. PATENT DOCUMENTS

| | | | |
|---|---|---|---|
| 2020/0258420 A1 | 8/2020 | Kurani | |
| 2022/0028003 A1 | 1/2022 | Evans et al. | |
| 2025/0112878 A1* | 4/2025 | Bayless | H04L 51/02 |

OTHER PUBLICATIONS

Udacity for Teams; Identifying Opportunities for Implementing Generative AI At Financial Institutions; https://medium.com/@udacity/identifying-opportunities-for-implementing-generative-ai-at-financial-institutions-b577b3c1bc84; Apr. 15, 2023; 24 Pages.

* cited by examiner

SYSTEMS AND METHODS FOR AN EDUCATIONAL GENERATIVE ARTIFICIAL INTELLIGENCE MODEL

TECHNICAL FIELD

The present disclosure relates generally to generative artificial intelligence (AI), more specifically to a reverse configuration of a generative AI model.

BACKGROUND

Artificial intelligence (AI) may be used to provide information to a user. More specifically, generative AI models may be used to provide a relatively robust set of information to the user, as the generative AI models may improve over time via continuous interactions with the generative AI model. With these continued interactions, the training dataset may become more robust thereby enabling a relatively greater and more robust set of information that may be provided to users. However, users may become overwhelmed with the amount of information available thereby leading to repeated and, often non-specific, searches to obtain desired information. Improved operating configurations may be desirable to improve search/query efficacy.

SUMMARY

One embodiment relates to a provider computing system. The provider computing system includes at least one processing circuit having at least one processor coupled to at least one memory device and at least one artificial intelligence (AI) system. The at least one memory device stores instructions thereon that, when executed by the at least one processor, cause the at least one processing circuit to perform operations including: retrieving first data from one or more data sources, wherein the first data comprises information associated with a user; generating a model associated with the user based on the first data; and receiving, from a client computing device of the user, a query for information relating to a primary topic. The at least one AI system is configured to perform operations including: generating a user knowledge dataset related to the primary topic; determining one or more prompts according to the user knowledge dataset; presenting, via a user interface of the client computing device, the one or more prompts to the user; and receiving, via the user interface of the client computing device, a response to the one or more prompts from the user. The at least one AI system may be a generative AI system in some embodiments. The generative AI system may include a generative AI model that can obtain a general request (e.g., "help me with my finances") from a user, obtain information associated with the user (e.g., contextual information, such as a current location of the user, and user information such as account information), and then generate a response that is specific to the user's individual circumstances despite the general query relating to the search query (in this instance, financial help). The use of the generative AI model in a reverse operation may teach the user "how to learn something," rather than simply provide formulaic responses (e.g., teach a user "how to create a financial plan" rather simply generating the financial plan for the user, etc.).

Another embodiment relates to a method. The method includes: retrieving, by one or more processors of a provider computing system, first data from one or more data sources, wherein the first data comprises information associated with a user; receiving, by the provider computing system from a client computing device of the user, a query for information relating to a primary topic; generating, by at least one artificial intelligence (AI) system of the provider computing system, a user knowledge dataset relating to the primary topic; determining, by the at least one AI system, one or more prompts according to the user knowledge dataset; causing, by the provider computing system, a presentation of a user interface of via the client computing device of the one or more prompts; and receiving, by the provider computing system via the user interface of the client computing device, a response to the one or more prompts from the user.

Still another embodiment relates to a non-transitory computer-readable storage media having instructions stored thereon that, when executed by at least one processor of a provider computing system, cause the provider computing system to perform operations. The operations include: retrieving first data from one or more data sources, wherein the first data comprises information associated with a user; receiving, from a client computing device of the user, a query for information relating to a primary topic; generating, by at least one artificial intelligence (AI) system, a user knowledge dataset relating to the primary topic; determining, by the at least one AI system, one or more prompts according to the user knowledge dataset; causing a presentation of a user interface by the client computing device, the presentation comprising the one or more prompts; and receiving a response to the one or more prompts.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE FIGURES

These and other aspects and features of the present implementations are depicted by way of example in the figures discussed herein. Present implementations can be directed to, but are not limited to, examples depicted in the figures discussed herein. Thus, this disclosure is not limited to any figure or portion thereof depicted or referenced herein, or any aspect described herein with respect to any figures depicted or referenced herein.

DETAILED DESCRIPTION

Figure 1:
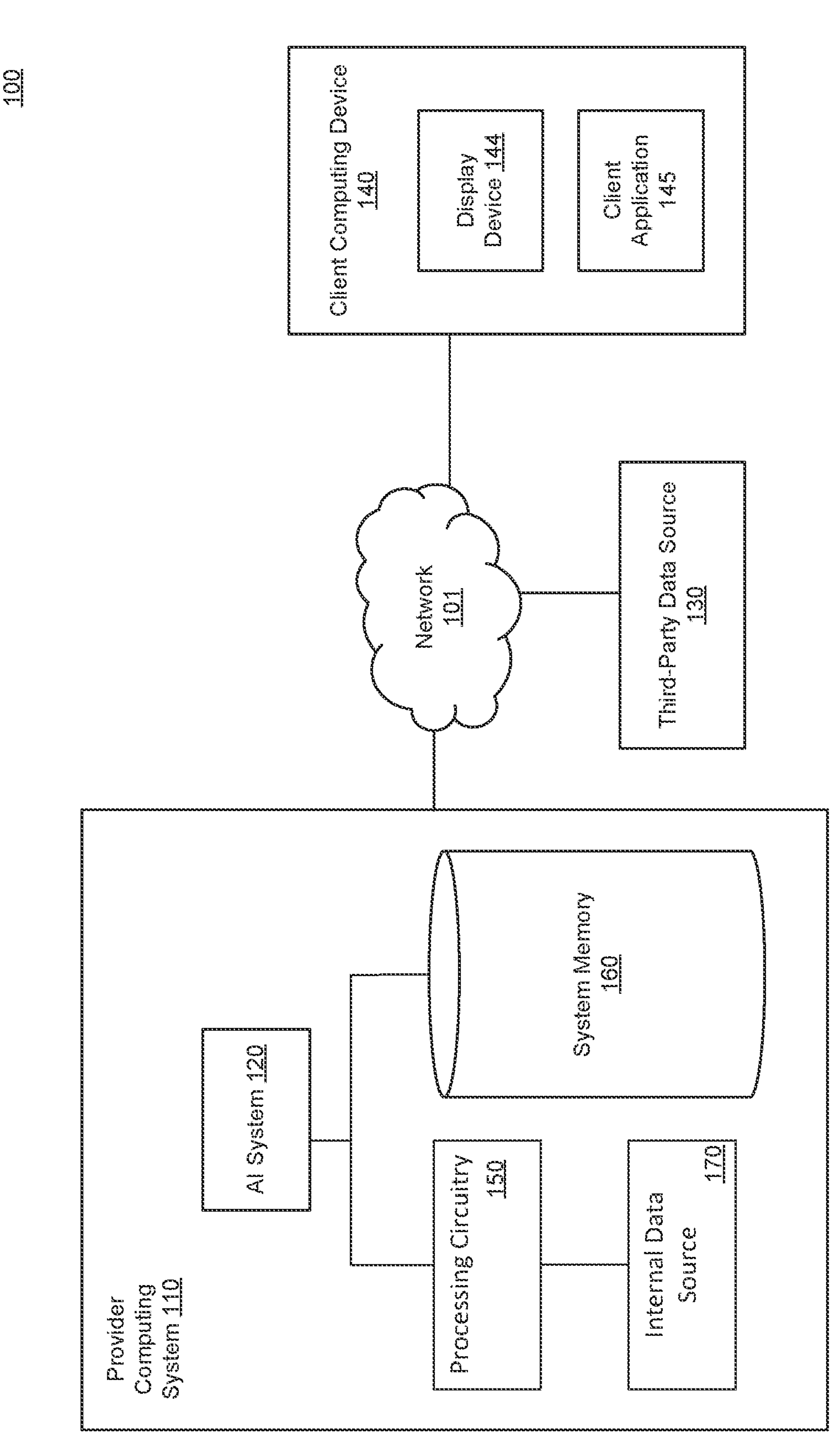
FIG. 1 depicts a block diagram of a system with an AI sub-system, according to an example embodiment.

Aspects of this technical solution are described herein with reference to the figures, which are illustrative examples of this technical solution. The figures and examples below are not meant to limit the scope of this technical solution to the present implementations or to a single implementation, and other implementations in accordance with present implementations are possible, for example, by way of interchange of some or all of the described or illustrated elements. Where certain elements of the present implementations can be partially or fully implemented using known components, only those portions of such known components that are necessary for an understanding of the present implementations are described, and detailed descriptions of other portions of such known components are omitted to not obscure the present implementations. Terms in the specification and claims are to be ascribed no uncommon or special meaning unless explicitly set forth herein. The systems, methods, computer-readable media, and apparatuses described herein relate to an artificial intelligence system, and particularly a generative artificial intelligence system, configured or structured to provide assistance to users in receiving specific training and/or educational material relating to a particular topic.

According to various embodiments described herein, the systems, methods, and computer-readable media described herein relate to a technical solution of using a generative AI model in a reverse operation. In this reverse operation configuration, the generative AI model receives general inputs from a user and, in response, provides user specific content, and particularly training material or information. The generative AI model can obtain a general request (e.g., "help me with my finances") from a user, obtain information associated with the user (e.g., contextual information, such as a current location of the user, and user information such as account information), and then generate a response that is specific to the user's individual circumstances despite the general query relating to the search query (in this instance, financial help). As described herein, the use of the generative AI model in a reverse operation may teach the user "how to learn something," rather than simply provide formulaic responses. For example, the generative AI model described herein can teach a user "how to create a financial plan" rather simply generating the financial plan for the user. The generative AI model can generate training material based on a user's prior knowledge surrounding the topic, any goals specified by the user, and general knowledge thresholds relating to the topic in order to teach the user about the topic.

The systems, methods, and computer-readable media described herein offer technical improvements to existing AI systems. For example, the generative AI model as described herein reduces bandwidth by limiting the number of searches a user may submit in order to learn about a topic. By developing a learning strategy unique to the user based on goals and/or knowledge thresholds, the generative AI model is configured to teach a user about a particular topic based on one query which relates to the topic. In this way, the user may progressively learn more about the topic and not have to submit additional queries to the system in order to continue learning. The operation of generative AI models in this manner, that is, in a reverse operation such that the model is configured to teach a user in response to a general input, is not well-understood, routine, or conventional activity as this operating configuration may be opposite to typical operations that receive search queries and provide formulaic responses based on the search queries. Further, the use of user contextual information may enable customization and tailoring of responses to be specific to the user and to the user's particular contextual situation thereby potentially improving the efficacy of the information provided by the AI system to the user. These non-conventional operating characteristics may lead to more desirable AI system operation for users as well as improved resource utilization, by decreasing the number of search queries to provide pertinent information faster to users. These and other features and benefits are described more fully herein below.

FIG. 1 depicts a block diagram of system architecture utilizing an artificial intelligence (AI) system to teach, inform, and/or otherwise educate a user among other operations/functions, according to an example embodiment. As illustrated by way of example in FIG. 1, the system 100 can include at least a network 101, a provider computing system 110 having an AI system 120, a third-party data source 130, and a client computing device 140. The network 101 may communicably couple the components and/or systems to each other. As described herein, the provider computing system 110 may receive inputs (e.g., goals, questions, situations, challenges, etc.) from a user via a user interface (e.g., a user interface of a display device 144, etc.) of the client computing device 140. The provider computing system 110 may draw from one or more data sources (e.g., the third-party data source 130, an internal data source 170, etc.) to obtain information associated with a user (e.g., transaction history, financial information, learning metrics, etc.) to generate a profile associated with the user. Based on the profile, the provider computing system 110 may be configured to construct a learning model for the user. The learning model may be based on a user background, one or more topics of interest to the user, a preferred learning strategy of the user, a progress report of the user, etc.

The network 101 can include any type or form of one or more networks. The geographical scope of the network 101 can vary widely and the network 101 can include a body area network (BAN), a personal area network (PAN), a local-area network (LAN), e.g., Intranet, a metropolitan area network (MAN), a wide area network (WAN), or the Internet. The topology of the network 101 can be of any form and can include, e.g., any of the following: point-to-point, bus, star, ring, mesh, or tree. The network 101 can include an overlay network which is virtual and sits on top of one or more layers of other networks. The network 101 can be of any such network topology as known to those ordinarily skilled in the art capable of supporting the operations described herein. The network 101 can utilize different techniques and layers or stacks of protocols, including, e.g., the Ethernet protocol, the Internet protocol suite (TCP/IP), the ATM (Asynchronous Transfer Mode) technique, the SONET (Synchronous Optical Networking) protocol, or the SD (Synchronous Digital Hierarchy) protocol. The TCP/IP Internet protocol suite can include application layer, transport layer, Internet layer (including, e.g., IPv6), or the link layer. The network 101 can include a type of a broadcast network, a telecommunications network, a data communication network, or a computer network.

The provider computing system 110 is owned by, associated with, or otherwise operated by a provider institution (e.g., a bank or other financial institution) that maintains one or more accounts held by various customers (e.g., the customer/user associated with the client computing device 140), such as demand deposit accounts, credit card accounts, receivables accounts, and so on. In some instances, the provider computing system 110 may comprise one or more servers, each with one or more processing circuits having one or more processors configured to execute instructions stored in one or more memory devices to send and receive data stored in the one or more memory devices and perform other operations to implement the features, methods, and operations described herein. In the example shown, the provider computing system 110 includes an AI system 120, a processing circuitry 150, a system memory 160, and an internal data source 170.

The AI system 120 may include one or more servers, databases, or cloud computing environments that may execute one or more generative AI models. The generative AI models may include, but are not limited to, large language models (LLMs), which can be trained to generate human-like text, speech, images, and/or components of graphical user interfaces. The generative AI models may be structured using a deep learning architecture that includes a multitude of interconnected layers, including attention mechanisms, self-attention layers, and transformer blocks. The generative AI models are trained on large datasets to assimilate patterns, structures, and relationships within the data. The trained generative AI models can be trained to generate outputs that resemble or closely resemble the characteristics of the input data. The generative AI models may be fine-tuned to generate specific output data, including data that is compatible with various database architectures or provider computing systems. The generative AI models can be trained via optimization of a large number of parameters, in which the generative AI models learn to minimize the error between its predictions and the actual data points, resulting in highly accurate and coherent generative capabilities.

The processing circuitry 150 includes one or more processing circuits including one or more processors coupled to one or more memory devices. The processing circuitry 150 can include, but is not limited to, at least one microcontroller unit (MCU), microprocessor unit (MPU), central processing unit (CPU), graphics processing unit (GPU), physics processing unit (PPU), embedded controller (EC), and/or the like. The processing circuitry 150 can include a memory operable to store or storing one or more instructions for operating components of the processing circuitry 150 and operating components operably coupled to the processing circuitry 150. For example, the one or more instructions can include one or more of firmware, software, hardware, operating systems, embedded operating systems. The memory may include one or more devices (e.g., RAM, ROM, Flash memory, hard disk storage) for storing data and/or computer code for completing and/or facilitating the various processes described herein. The memory may include non-transient volatile memory, non-volatile memory, and non-transitory computer storage media, database components, object code components, script components, or any other type of information structure for supporting the various activities and information structures described herein. The processing circuitry 150 or the provider computing system 110 generally can include one or more communication bus controllers to effect communication between the processing circuitry 150 and the other elements of the provider computing system 110.

According to some exemplary embodiments, the provider computing system 110 may comprise an interface controller. The interface controller is a controller structured or configured to link the provider computing system 110 with one or more of the network 101, the client computing device 140, and the third-party data source 130, by one or more communication interfaces. A communication interface can include, for example, an application programming interface ("API") compatible with a particular component of the provider computing system 110, the client computing device 140, or the third-party data source 130. The communication interface can provide a particular communication protocol compatible with a particular component of the provider computing system 110 and a particular component of the client computing device 140 or the third-party data source 130. The interface controller can be compatible with particular content objects and can be compatible with particular content delivery systems corresponding to particular content objects, structures of data, types of data, or any combination thereof. For example, the interface controller can be compatible with transmission of video content, audio content, image data, or any combination thereof.

The system memory 160 can store data associated with the provider computing system 110. The system memory 160 can include one or more hardware memory devices to store binary data, digital data, or the like. The system memory 160 can include one or more electrical components, electronic components, programmable electronic components, reprogrammable electronic components, integrated circuits, semiconductor devices, flip flops, arithmetic units, or the like. The system memory 160 can include at least one of a non-volatile memory device, a solid-state memory device, a flash memory device, or a NAND memory device. The system memory 160 can include one or more addressable memory regions disposed on one or more physical memory arrays. A physical memory array can include a NAND gate array disposed on, for example, at least one of a particular semiconductor device, integrated circuit device, and printed circuit board device.

The third-party data source 130 or computing system may be associated with a third-party (e.g., owned by, operated by, managed by, and/or otherwise associated with). The third-party is an entity that is a third-party relative to the provider entity/institution. While only one third-party data source is depicted, it should be appreciated that multiple third-parties can be included in the system 100 and coupled, via the network, to the provider computing system 110. The third-party computing system can be a cloud system, a server, a distributed remote system, or any combination thereof. As another example, the third-party system can include an operating system to execute a virtual environment. The operating system can include hardware control instructions and program execution instructions. The operating system can include a high-level operating system, a server operating system, an embedded operating system, or a boot loader.

The client computing device 140 is owned, operated, controlled, managed, and/or otherwise associated with a user. In this example, the user is a customer of the provider institution. In some embodiments, the client computing device 140 may be or may comprise, for example, a desktop or laptop computer (e.g., a tablet computer), a smartphone, a wearable device (e.g., a smartwatch), a personal digital assistant, and/or any other suitable computing device. In the example shown, the client computing device 140 is structured as a mobile computing device, namely a smartphone. The client computing device 140 can communicate with the provider computing system 110 by the network 101 via one or more communication protocols therebetween.

The client computing device 140 can include one or more I/O devices, a network interface circuit, at least one processing circuit, and various other components and/or systems. The client computing device 140 is shown to include an I/O device as a display device 144. While the term "I/O" is used, it should be understood that the I/O devices may be input-only devices, output-only devices, and/or a combination of input and output devices. In some instances, the I/O devices include various devices that provide perceptible outputs (such as display devices with display screens and/or light sources for visually perceptible elements, an audio speaker for audible elements, and haptics or vibration devices for perceptible signaling via touch, etc.), that capture ambient sights and sounds (such as digital cameras, microphones, etc.), and/or that allow the user to provide inputs (such as a touchscreen display, stylus, keyboard, force sensor for sensing pressure on a display screen. The I/O devices can include a display configured to present a user interface or graphical user interface. The I/O devices can output at least one or more user interface presentations and control affordances. The I/O devices can generate any physical phenomena detectable by human senses, including, but not limited to, one or more visual outputs, audio outputs, haptic outputs, or any combination thereof.

The display device 144 can display at least one or more user or graphical user interfaces. The display device 144 can include, for example, a liquid crystal display (LCD), a light-emitting diode (LED) display, an organic light-emitting diode (OLED) display, or the like. The display device 144 can receive, for example, capacitive or resistive touch input.

The client computing device 140 is also shown to include a client application 145. The client application 145 may be a financial institution banking application provided by and at least partly supported by the provider computing system 110. In some instances, the client application 145 is coupled to the provider computing system 110 and may enable account management regarding one or more accounts held at the provider institution associated with the provider computing system 110 (e.g., funds transfers, bill payment, etc.). In some instances, the client application 145 provided by the provider computing system 110 incorporates various functionality provided by or otherwise enabled by the provider computing system 110 (e.g., initiating and/or approving transfers) using one or more application programming interfaces (APIs) and/or software development kits (SDKs) provided by the provider computing system 110. Accordingly, the client application 145 is structured to provide the user with access to various services offered by the provider institution.

In some embodiments, the client application 145 is hard coded into the memory of the client computing device 140. Thus, the client application 145 may be executed or run by one or more processors of the client computing device 140. In some embodiments, the client application 145 is a web-based interface application, where the user has to log onto or access the web-based interface before usage, and the application is supported by a separate computing system comprising one or more servers, processors, network interface circuits, or the like (e.g., the provider computing system 110), that transmit the applications for use to the client computing device 140.

Figure 2:
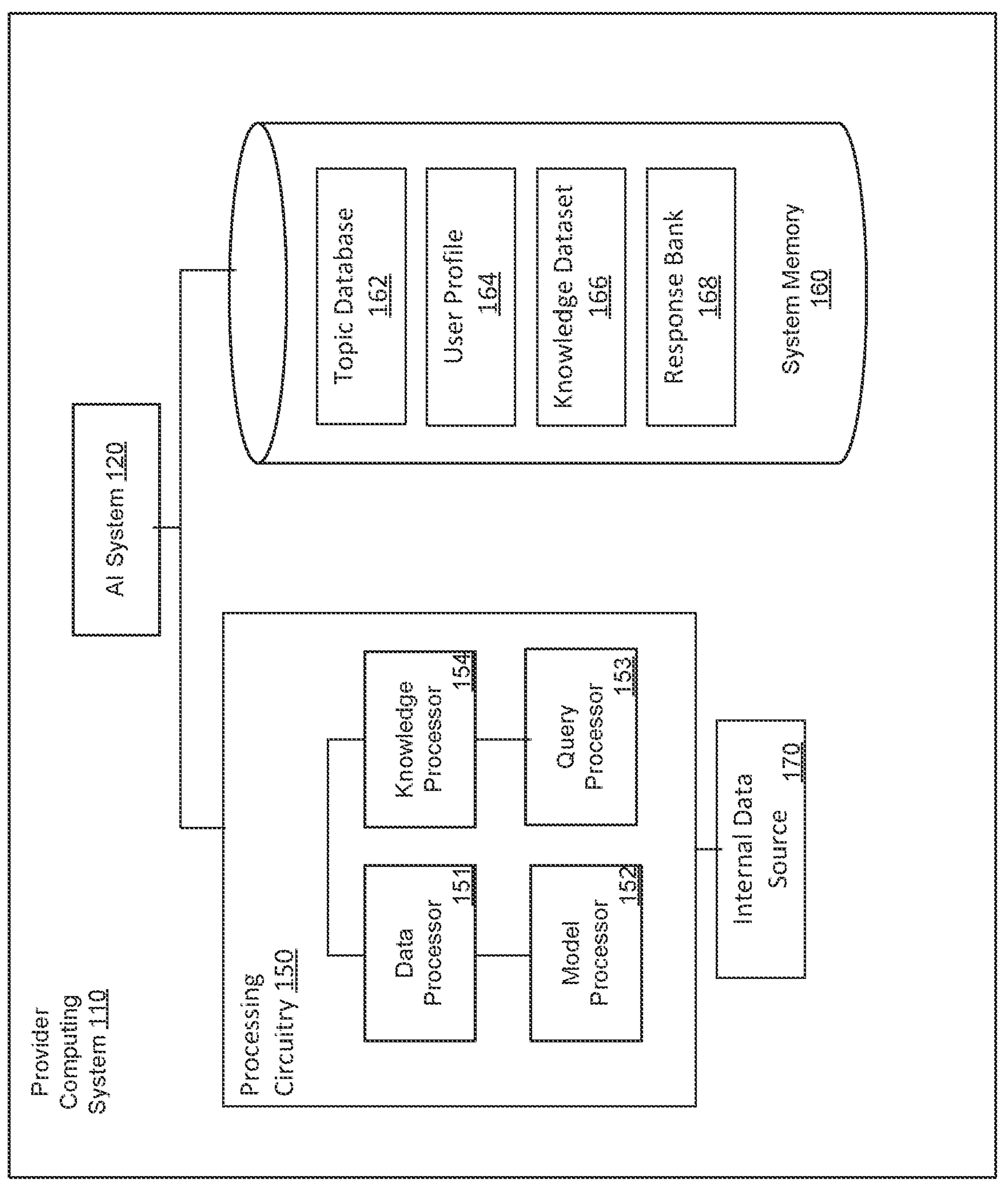
FIG. 2 depicts a provider computing system of the system of FIG. 1, according to an example embodiment.

FIG. 2 depicts, in greater detail, the provider computing system 110 of the system 100 of FIG. 1, according to an example embodiment. The processing circuitry 150 is shown to include a data processor 151, a model processor 152, a query processor 153, and a knowledge processor 154. These processors may be sub-processing components of the processing circuitry 150. The processing circuitry 150 is coupled to the system memory 160. The system memory 160 is shown to include a topic database 162, a user profile 164, a knowledge dataset 166, and a response bank 168.

The data processor 151 may be one or more processors that are structured or configured to analyze, parse, inspect, or otherwise process data received from at least one of the third-party data source 130, the client computing device 140 (e.g., data received as an input from a user via a user interface of the display device 144), and the internal data source 170. The data processed by the data processor 151 may comprise information associated with the user (e.g., transaction history, financial information, academic performance, etc.).

The model processor 152 may be one or more processors that are structured or configured to generate a profile associated with the user based on the data processed by the data processor 151. The profile associated with the user may comprise information related to goals, questions, situations, etc., presented by the user via the client computing device 140. The profile associated with the user may further comprise a learning model associated with the user based on a use history (e.g., a progress report, an interaction log, etc.) stored in the internal data source 170.

The query processor 153 may be one or more processors that are structured or configured to analyze, parse, inspect, or otherwise process an input/prompt/query received from the client computing device 140. The query may be a request for information relating to a topic or topics. The query processor 153 can include an electronic processor, an integrated circuit, or the like including one or more of digital logic, analog logic, digital sensors, analog sensors, communication buses, volatile memory, nonvolatile memory, and the like. The query processor 153 can include, but is not limited to, at least one microcontroller unit (MCU), microprocessor unit (MPU), central processing unit (CPU), graphics processing unit (GPU), physics processing unit (PPU), embedded controller (EC), or the like. The query processor 153 may be configured to receive a text input, voice input, image input, video input, or any combination thereof (e.g., a query) from the client computing device 140. The query processor 153 may be configured to parse the text input into tokens (e.g., phrases, passages, individual words, sub-words, punctuation, etc.). The query processor 153 may be configured to transform, convert, or otherwise encode each token generated for the text input into an encoded token. The encoded token may be encoded into a format (such as vector format, word embeddings, etc.) that is compatible with one or more user interfaces as described in greater detail herein. The query processor 153 may parse the query and encode the tokens for applying to one or more neural networks of the AI system 120. The query processor 153 can detect a particular structure or format of the input or the query and can generate a query having a particular structure or format, based on the input.

The knowledge processor 154 may be one or more processors that are structured or configured to, based on a query relating to a particular topic, determine a user's knowledge regarding the particular topic. In some embodiments, the knowledge processor 154 retrieves data from the knowledge dataset. The knowledge processor 154 may be configured to retrieve data relating to a general knowledge of the particular topic. Further, the knowledge processor 154 may be configured to compare the user's knowledge to the general knowledge in order to determine a learning path for the user. In some embodiments, the knowledge processor 154 may use a user response history (e.g., from data stored in the response bank 168) to evaluate the user's knowledge of the particular topic.

The knowledge processor 154 may be further configured to generate a node diagram. The node diagram may be a representation, particularly a graphical representation, of a primary topic relative to at least one secondary topic relating to the primary topic. The node diagram may comprise a plurality of nodes, each of the plurality of nodes corresponding to a secondary topic (e.g., retrieved from topic database 162) that relates to the topic queried by the user (which may be referred to as a primary topic). In some embodiments, the AI system 120 may be configured to, based on the comparison between the user's knowledge and the general knowledge, assign a value to each of the nodes, wherein the value of each of the nodes is used to determine one or more prompts for presenting to the user. For example, a value of 2 may indicate that the user has an insufficient knowledge of the topic represented by its corresponding node, while a value of 9 may indicate proficiency in the topic represented by its corresponding node, and the AI system 120 may generate prompts to present to the user relating to the topic corresponding to the node with a value of 2.

The topic database 162 may be a dataset including information regarding an array of topics (e.g., topics or categories that may be the subject of one or more queries from a user). For example, the topic database 162 may store a record of topics that users have previously searched. Thus, as more users perform more searches, the topic database 162 may grow with content over time. For each of the topics stored in the topic database 162, the topic database 162 may store associated secondary or sub-topics. In some embodiments, the topic database 162 may categorize each of the stored topics as a primary topic or as a secondary topic. For example, the primary topic may comprise a broadly defined subject (e.g., finance), while the secondary topic may comprise a specific topic relating to the primary topic (e.g., stock trading, portfolio management, bond maturation, etc.).

In some embodiments, the topic database 162 may categorize each of the stored topics based on the tokens applied to the AI system 120 from the query processor 153. For example, if a user submits a query of "teach me how to manage my investment portfolio," the query processor 153 may be configured to tokenize the term "investment" into a token to send to the AI system 120. The AI system 120 may be configured to associate the tokenized term "investment" with one or more other tokenized terms (e.g., "stock," "bond," "finance," etc.). In some embodiments, the one or more other tokenized terms may have been included with the term "investment" in a previous query (e.g., "Help me with my finances. How should I incorporate stocks and bonds into my investment portfolio?"). In this example, the topic database 162 may store "finance" as a primary topic and "investment," "stock," and "bond" each as a secondary topic to "finance." Therefore, when a user submits a query related to a primary topic, for example, the processing circuitry 150 may be configured to determine, from the topic database 162, one or more secondary topics related to the primary topic. In some embodiments, the secondary topics may be presented to the user as a suggested topic upon reaching a mastery (e.g., a predefined level) of the primary topic.

The user profile 164 may be a dataset including information related to a user. As the user is a customer of the provider entity, the provider computing system 110 may store information regarding the user. For example, the user profile 164 may comprise data from the internal data source 170 such as account data (e.g., personal information, financial data, transaction history, a history of learning sessions between the user and the provider computing system 110, etc.). The user profile 164 may further comprise data retrieved from the third-party data source 130 (e.g., academic record, etc.).

The knowledge dataset 166 may be a dataset including information regarding a knowledge of the user. The "knowledge" of the user refers to a familiarity with and/or understanding of various topics of a plurality of topics (e.g., the topics stored in the topic database 162). In some embodiments, the knowledge of the user may be determined by analyzing a history of user responses (e.g., responses stored in the response bank 168, etc.), account information (e.g., data stored in the internal data source 170), third-party data (e.g., retrieved from the third-party data source 130), etc., to detect a presence of words, phrases, actions, etc., indicating a user's familiarity with various topics of the plurality of topics. For example, the knowledge dataset 166 may indicate a knowledge of the user about bonds based on a bond investment history (from internal data source 170, third-party data source 130, etc.), previous responses to one or more prompts from the provider computing system 110 relating to bonds, etc. The knowledge dataset 166 may further comprise a general knowledge of a topic related to a query presented to the user via a user interface. The "general knowledge" of the topic refers to a familiarity with and/or understanding of the topic of a person with an ordinary knowledge of the topic. For example, in the topic of finance, general knowledge may be measured according to the knowledge of a person with a bachelor's degree in finance but may not be measured according to the knowledge of a person with a doctorate degree in finance. In some embodiments, the general knowledge may comprise data retrieved from at least one of the internal data source 170 (e.g., knowledge of other users associated with accounts enrolled in the provider institution, etc.) and the third-party data source 130.

The response bank 168 may be a dataset including information regarding a history of user responses to one or more prompts generated by the AI system 120. Each of the user responses may correspond to one or more of the topics stored in the topic database 162. In some embodiments, the response bank 168 may be configured to associate a value, such as a score, with each of the user responses included in the history of user responses. The score may be determined by comparing a user response to a correct response and/or a sample response (e.g., formulated by the AI system 120) to the one or more prompts. For example, the AI system 120 may determine one correct response (e.g., one investment scenario out of an array of investment scenarios that achieves a highest return) to the one or more prompts, or the AI system 120 may determine a sample response (e.g., a potential investment strategy including stocks and bonds). The sample response refers to one or more possible responses to the one or more prompts. The AI system 120 may formulate the sample response based on the general knowledge of the particular topic (e.g., the general knowledge as described herein below). For example, the AI system 120, upon receipt of a user response to the one or more prompts, can determine that the user submitted a correct response. In this example, the response bank 168 may associate a score (e.g., a 10 out of a 10-point scale) to the user response.

As another example, the AI system 120, upon receipt of the user response to the one or more prompts, can determine that the user submitted a response with a match value (e.g., a percentage, a ratio, etc.) to the sample response (e.g., the user response included an investment strategy including stocks, but not bonds). When there is not one correct response to the one or more prompts, the match value may serve as an indication of the user's knowledge of the topic. The match value is a measure of how similar the user-submitted response is to the sample response determined by the AI system 120. The match value may be calculated or determined by the AI system 120 based on whether the user response includes one or more key words from the sample response, whether the user response achieves a same outcome of the sample response, etc. For example, the AI system 120 may be configured to identify tokenized items/information in the user response (e.g., "stock," "bond," "finance," etc.) that match tokenized items in the sample response. The match value may be the relative amount (which may be expressed as a percentage or other value) of tokenized items from the sample response that are also identified in the user response. The score associated with the user response may then reflect the match value (e.g., a score of 5 may indicate a 50% match value, a score of 7 may indicate a 70% match value, etc.). For example, in response to the one or more prompts asking, "generate a sample investment portfolio with low-risk securities," the AI system 120 may determine a sample low-risk investment portfolio, such as opening a CD account, investing in municipal bonds, and investing in treasury bonds. The user, in response to these determined one or more prompts, may submit a response via the client application 145 selecting the sample investment portfolio including municipal bonds and government bonds. The AI system 120 may determine a match value of 67%, based on the user response including government bonds and municipal bonds, but lacking a CD account. Thus, the response bank 168 may associate a score of 6.7 (out of the 10-point scale) to the user response.

The knowledge processor 154 may be structured or configured to determine a user knowledge of one or more topics stored in the topic database 162. In some embodiments, the knowledge processor 154 determines the user knowledge of the one or more topics by evaluating a value (e.g., score) associated with each of the user responses stored in response bank 168. The evaluation of the value may comprise identifying whether, in response to a prompt with a correct response identified by the AI system 120, the user submitted the correct response. Alternatively, in response to a prompt with a sample response determined by the AI system 120, the evaluation of the value may comprise identifying the match value. The knowledge processor 154 may be configured to determine the user knowledge of the one or more topics if the value associated with each of the user responses relating to the one or more topics exceeds a predefined passing threshold value or level (e.g., the passing level may comprise, out of the 10-point scale, a score of 6 or higher). In some embodiments, the knowledge processor 154 determines the user knowledge of the one or more topics based on data retrieved from one or more data sources (e.g., internal data source 170, third-party data source 130, etc.). For example, the internal data source 170 may indicate that the user has a CD account. The knowledge processor 154 may determine the user knowledge of CD accounts based on this information. The user knowledge of the one or more topics may be thereafter stored in the knowledge dataset 166.

Figure 3:
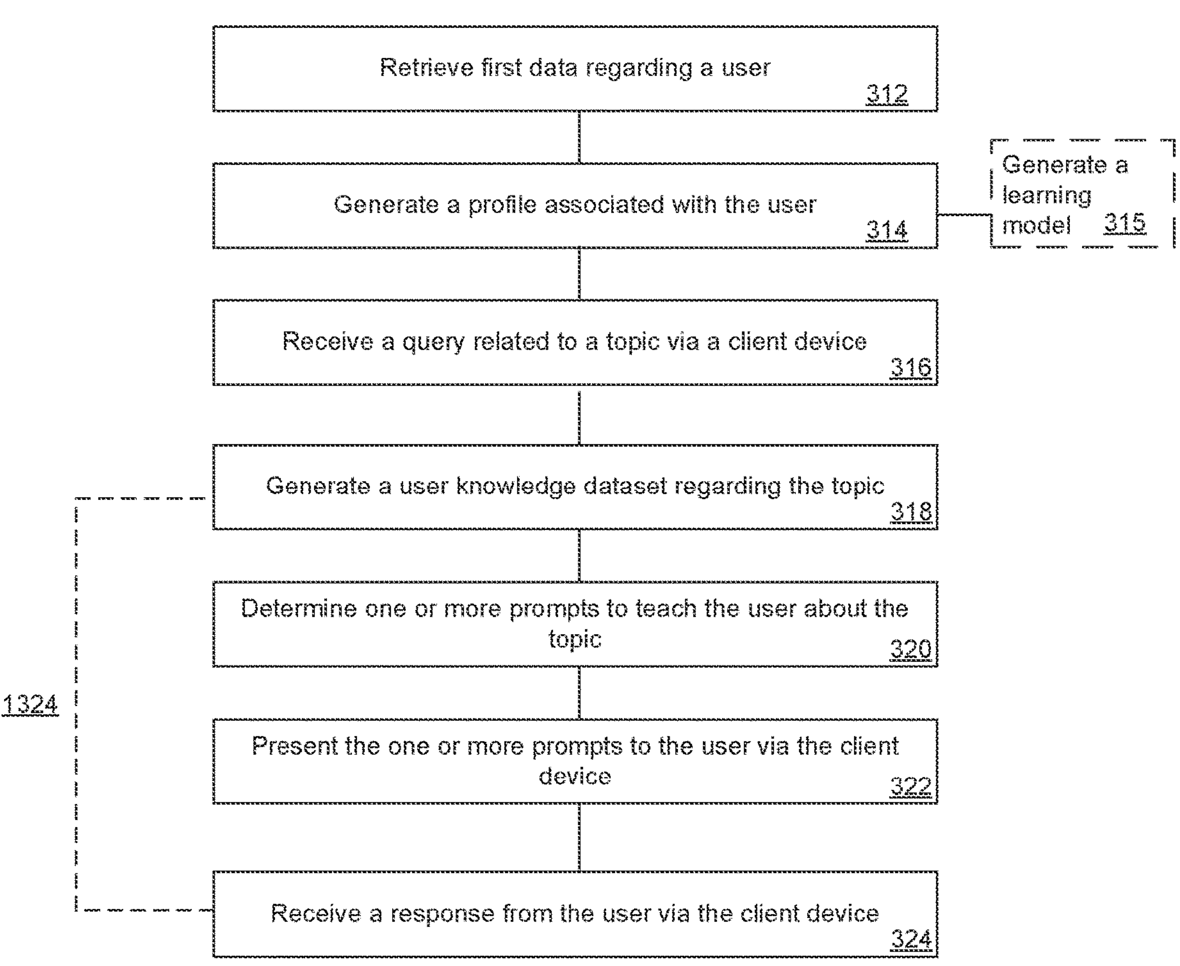
FIG. 3 depicts a method of learning from an AI system, according to an example embodiment.

FIG. 3 depicts a method 300 of learning from an AI system, according to some embodiments. Various components and/or systems of the provider computing system 110 can perform the method 300. Via the method 300, the provider computing system 110 may allow the provider computing system 110 to receive information (e.g., informal text descriptions, bullet point lists, and other data from a user via a client computing device (e.g., client computing device 140)) and generate one or more prompts configured to teach the user about a topic or category.

In some embodiments, method 300 may begin upon a user accessing the client application 145. The user may submit authentication credentials (e.g., a username, a password, a pin code, a biometric such as a facial scan or a fingerprint, etc.) to access the client application 145. The client application 145 may, via a network interface of the client computing device 140, transmit the authentical credential(s) to the provider computing system 110. The provider computing system 110 may validate/verify the credentials. In some embodiments, the client application 145 may itself validate/verify the credentials.

At process 312, first data is retrieved upon successful authentication of the user. The provider computing system 110 and/or client application 145 may validate the authentication credentials. Authentication of the credentials may enable the user/customer to access the client application 145 (e.g., via account balances, user profile information, etc.). Successful authentication may initiate a secure communication session over the network with the provider computing system 110. Via the secure communication session, first data regarding the user may be retrieved by the client application 145 and/or provider computing system 110. The first data may comprise information associated with a user, such as information stored in an account profile of the user (e.g., transaction history, financial information, academic performance, knowledge background, etc.). The first data may be retrieved by the processing circuitry 150 from the third-party data source 130, the internal data source 170, and/or the client computing device 140. The first data may be retrieved by the provider computing system 110 via the client application 145. In some embodiments, the first data may be processed by the data processor 151 of the processing circuitry 150.

First data may further comprise contextual information associated with the user. Contextual information refers to information associated with a context of a user. The contextual information may include location information associated with the user. In one embodiment and upon a successful authentication, the client application 145, via the client computing device 140, may transmit a data payload that includes a location identifier location identifier (e.g., GPS information) associated with the client computing device 140. The contextual information may also include time information. For example, a date of access (e.g., a timestamp) may be further transmitted to the provider computing system 110 in the aforementioned data payload upon a successful authentication into the client application 145. Other contextual information may include, but is not limited, a time or season of the year, a direction of movement of the user (e.g., based on tracking the location information from the user's mobile device), a determination of entities proximate the user (e.g., using the user's location or trajectory of location of information, the provider computing system 110 may use a map to identify places nearby, such as nearby financial institutions), weather information associated with the determined location, and so on.

At process 314, a profile associated with the user is generated and/or retrieved. In particular, upon a successful authentication into the client application 145, the provider computing system 110 may identify the user who accessed the client application 145. Upon identification, the provider computing system 110 may retrieve a profile associated with the user, which may be stored in the user profile 164.

Based on the retrieved user profile, the provider computing system 110 may be configured to construct a learning model for the user. The learning model may be based on information stored in the user profile, such as a user background, one or more topics of interest to the user, a preferred learning strategy of the user, a progress report of the user, etc. The learning model refers to a personalized teaching strategy configured to teach the user about the one or more topics of interest to the user. The personalized teaching strategy may comprise one or more particular question formats, a duration of teaching, and/or other information regarding a learning format for the particular user. The learning model may comprise a set of instructions configured to instruct the AI system 120 to formulate the one or more prompts according to a particular format defined by the user-specific learning model. The particular format refers to a format of the one or more prompts generated by the AI system 120 that is determined to be pertinent to the user, as described above. For example, if the profile associated with the user indicates that the user obtains a higher average score (e.g., the score associated with each of the user responses stored in the response bank 168) to multiple-choice questions than to free response questions, the learning model may instruct the AI system 120 to generate the one or more prompts in a multiple-choice format. In some embodiments, the learning model may be updated as the user interacts with the system more frequently. For example, when the user spends additional time interacting with the system by responding to successive prompts generated by the AI system 120, the response bank 168 may store additional scores associated with each of the user responses. Thus, the profile associated with the user may reflect an expanded user knowledge dataset (e.g., the profile may be updated to reflect the additional scores associated with each of the user responses). As additional scores are stored in the response bank 168, the provider computing system 110 may identify that the user obtains a higher average score to free response questions than to multiple-choice questions, and so the learning model may be updated to instruct the AI system 120 to generate prompts according to a free response format.

At process 316, a query is received. The query refers to an input from the user to the provider computing system 110. In one embodiment, the input may be received via the client application 145 after the successful authentication into the client application 145. This enables the provider computing system 110 to (a) receive contextual information associated with the authentication into client application 145, and (ii) retrieve user specific information from the user profile. The query may be in the form of a free-text input (e.g., a question, a statement, etc.) relating to a topic. The text-input may be received via the client application 145. In another embodiment, the query may be in the form of an image, video, and/or audio input. A graphical user generated and provided by the client application 145 may receive the query (e.g., a video of the user asking about information regarding a topic). The client application 145 may package the video query into a data payload and transmit it to the provider computing system 110. The provider computing system 110 may associate the query as being associated with the user based on it being received from the authenticated session of the client application 145. The provider computing system 110 may then parse the query to identify pertinent information associated therewith (e.g., words in the video, etc.).

The query may comprise a specific question (e.g., "How do I invest in stocks?"), or the query may comprise a request to learn about the topic (e.g., "Teach me about stocks."). The query may include contextual information (e.g., time submitted) surrounding the query. The contextual information of the query may be received as described herein above. In some embodiments, the received contextual information may be compared to contextual information of one or more previous queries submitted by the user by the provider computing system 110, such that the provider computing system 110 enables tracking the queries. The query may be processed by the processing circuitry 150 (e.g., by query processor 153). The query may relate to a particular topic about which the user is interested in learning.

The query processor 153 may determine a topic of a received query in a variety of different manners. As one example, in a textual query, such as "How do I invest in the stock market?", the query processor 153 may identify the terms "invest," "stock," and "market" based on parsing the textual query data. In this way, the query processor 153 may identify strings that have the terms "invest," "stock," and "market" (and/or predefined analogous terms) in order to identify one or more topics related to this query. In this example, the query processor may identify a topic of "investing in the stock market." As another example, the query may comprise an audio input (e.g., the user asks, via the client computing device 140, "How do I invest in the stock market?"). The AI system 120 may be configured to perform an audio-to-text conversion of the audio input. The audio-to-text conversion may comprise identifying a plurality of audio signals from the audio input and extracting a textual interpretation of each of the audio signals. The query processor 153 may identify the terms "invest," "stock," and "market" and create a token for each of the terms, as described herein above. The query processor 153 may be configured to identify the topic from the token in a same manner as from the textual query. In still another example, the query may comprise a video input. The AI system 120 may be configured to perform a video-to-text conversion of the video input. The video-to-text conversion may comprise identifying a pixelation pattern of one or more images from the video input and extracting a textual interpretation of each of the pixelation patterns of the one or more images. The query processor 153 may associate the textual interpretation with one or more tokenized terms. From the tokenized terms, the query processor 153 may be configured to identify the topic in the same manner as from the textual query.

At process 318, a user knowledge dataset is generated. The user knowledge dataset refers to a user's familiarity with and/or understanding of various topics (e.g., the topics stored in the topic database 162) and, particularly, the topic associated with the query. The user knowledge dataset may be generated by the AI system 120 based on information from at least one of the internal data source 170, the system memory 160, the third-party data source 130, and the client computing device 140. For example, the information may include information associated with a user account in the internal data source 170, prior responses to various prompts stored in the response bank 168, third-party data associated with the user in the third-party data source 130, and user-entered knowledge (e.g., via the client computing device 140) may be used by the AI system 120 to generate the user knowledge dataset.

The internal data source 170 of the provider computing system 110 may comprise financial information relating to a user account, such as transaction data, investment history, and so on. If the user wants to expand their investment portfolio, the user may submit a query, via the client application 145, asking "How should I expand my investment portfolio?" In this example, the general topic is determined by the provider computing system 110 to be finance or a finance-based topic. The AI system 120 may identify, from the internal data source 170, that the user currently has a 13-month CD account, that they previously held municipal bonds, and that they deposit 10% of their monthly income into a savings account. In operation, the AI system 120 may generate the user knowledge dataset indicating a familiarity with CD accounts and municipal bonds, but not a familiarity with stocks, based on the information from the internal data source 170 If, however, the AI system 120 retrieved data from a private stock exchange platform (e.g., third-party data source 130) where the user had invested in an index fund, the AI system 120 may update the user knowledge dataset to include a familiarity with index funds. In some embodiments, the user knowledge dataset relates to the topic associated with the query received at 316. By generating a user knowledge dataset, the provider computing system 110 is configured to store and update what topics and information the user already knows such that the AI system 120 does not generate redundant questions. The user knowledge dataset decreases bandwidth by generating relevant prompts and saves the user from submitting additional queries when they want to continue learning about a topic.

At process 320, one or more prompts are determined by the AI system 120 according to the user knowledge dataset generated a 318. As described herein, the "prompt" refers to information (e.g., content, material) that may be provided in response to a user query. The one or more prompts may take the form of a hypothetical scenario, a question, or other content format. The one or more prompts may be configured to teach the user about the topic identified in the query received at process 316. For example, the one or more prompts may comprise "What is 2+2?" Alternatively, the one or more prompts may include a presentation of four investment scenarios and may ask the user to select one of the four investment scenarios that can achieve the highest return. As yet another example, the one or more prompts may include one or more hypothetical choices to a financial decision and the impact of the one or more hypothetical choices on the user's financial information.

The one or more prompts determined by the AI system 120 may also be based on contextual information (e.g., the contextual information included in the first data retrieved at process 312). As mentioned herein, the contextual information may comprise a location identifier indicating that the user is accessing the client application 145 from a particular location (e.g., London). Based on this contextual information, if the user asks a query related to investment, the AI system 120 may be configured to generate prompts that include financial data in terms of the identified location (e.g., GBP such as the British Pound, stock trading data from the London Stock Exchange, British government bond rates, etc.). As another example, if the contextual information indicates that the user submits a query at a particular time (e.g., 5:52 PM on Jul. 2, 2023) that asks to learn how to cook, the AI system 120 may be configured to generate one or more prompts relating to cooking at this particular time (e.g., summer dinner recipes such as salads, barbeque, seafood, etc.). If the contextual information indicates that the user submits the same query at another time (e.g., 8:32 AM on Dec. 8, 2023), the AI system 120 may be configured to generate one or more prompts relating to that particular time (e.g., breakfast recipes such as omelets, pancakes, sausages, etc.). Thus, the AI system 120 may generate prompts in a dynamic nature based on contextual information, such as location information and/or time information.

In some embodiments, the AI system 120 may be configured to generate a challenge question to present to the user via the client computing device 140. The challenge question refers to an additional prompt of the one or more prompts generated by the AI system 120 that exceeds the difficulty of the one or more prompts generated in response to the user query. For example, the challenge question may comprise an additional prompt that introduces one or more additional secondary topics or that does not conform to the particular format specified by the learning model of the user.

At process 322, one or more prompts are presented to the user. The one or more prompts are first generated by the provider computing system 110 (i.e., the one or more prompts determined by the AI system 120 at process 320) and are then transmitted for display within a client application (e.g., client application 145) or another user interface (e.g., a web-browser, etc.). The one or more prompts may be presented to the user via a user interface of a display device (e.g., display device 144 of client computing device 140).

In some embodiments, the one or more prompts are presented to the user alongside a selectable element, a free-text box, or other means of eliciting the response from the user. The one or more prompts may be presented to the user according to a particular format based on learning preferences associated with the user profile (e.g., performance history indicates that the user learns most effectively when responding to multiple choice questions, etc.).

At process 324, a response is received from the user. The response is received by the client application (e.g., client application 145) and transmitted to the provider computing system 110. More particularly, the response may be received via the user interface of the display device (e.g., display device 144 of client computing device 140). In some embodiments, the response may comprise an interaction with the selectable element, the free-text box, or the other means of eliciting the response from the user presented at process 324.

Upon completion of process 324, the method 300 may comprise an iterative process 1324. The iterative process 1324 is configured to, based on the response received from the user via the client computing device 140 at process 324, update the user knowledge dataset generated, determine one or more updated prompts based on the updated knowledge dataset, present the one or more updated prompts to the user via the client computing device 140, and receive a response to the one or more updated prompts from the user via the client computing device 140. Via the iterative process 1324, the AI system 120 may be configured to teach the user depending on the response received at 324 to assist the user in achieving a goal or obtaining a knowledge proficiency. In some embodiments, the iterative process 1324 continues until the user reaches a predefined level of competency relating to a topic, thus reducing the number of individual queries the user may otherwise need to submit in order to reach their learning goals and decreasing the bandwidth of the system.

The predefined level of competency may be a learning threshold calculated or determined by the AI system 120 according to at least one of general knowledge of the topic (e.g., the general knowledge stored in the knowledge dataset 166) or a user-entered goal (e.g., "I want to learn how to calculate derivatives."). In some embodiments, the learning threshold may be a predefined passing score or value (e.g., an average score of 6 on the 10-point scale) associated with the user responses stored in the response bank 168 that relate to a particular topic. For example, if the user asks to learn derivatives, the learning threshold may be reached once the average determined score of the user responses to the derivative-based prompts generated by the AI system 120 exceeds 6 (out of the 10-point scale). In some embodiments, the learning threshold may comprise a familiarity with one or more secondary topics related to the primary topic introduced in the user query. The familiarity may be determined by the presence of the one or more secondary topics in the knowledge dataset 166. For example, a presence of six secondary topics to the primary topic may comprise a familiarity with the primary topic. The one or more secondary topics may be secondary topics associated with the general knowledge of the topic. For example, if a user query is “I want to learn about stock trading,” the provider computing system 110 may generate a learning model (i.e., the learning model generated at process 314) to help the user achieve familiarity with a plurality of secondary concepts related to stock trading (e.g., dividend payments, call options, put options, etc.) based on the general knowledge of stock trading (e.g., the knowledge of a person with a bachelor’s degree in finance).

Based on the foregoing, method 300 be performed in an example operation as follows. A user with an account at the provider institution may be interested in learning about how to invest. Upon receiving an indication that the user has successfully accessed their account via the client application 145, the provider computing system 110 may retrieve contextual information including user account data (e.g., financial information, transaction history, application usage, etc.), a location from which the user submitted the query, and a timestamp at which the user submitted the query. The user’s account data may indicate that the user invested $1,000 into a 13-month certificate of deposit (CD) on Jun. 22, 2023. The location and timestamp may indicate that the user submitted the query from London at 8:52 PM. Additionally, the provider computing system 110 may retrieve data from a private loan provider (e.g., third-party data source 130) indicating that the user has $23,000 in outstanding student loans, the outstanding student loans having an interest rate of 4.1%. With this data, the provider computing system 110 creates a profile associated with the user. The user can submit, via the client application 145 the query of: “How to invest.” The provider computing system 110 may identify, through the AI system 120, the topic of finance in the query, and sub-topics such as investments, stocks, bonds, etc. Based on the contextual information, the computing system 110 may generate a user-specific learning strategy that focuses on financial investments available in England and in terms of the British pound. The user-specific learning strategy may also comprise notifying the client device 140 via the client application 145 of the learning strategy daily at 8:52 PM. From the user profile and account data, the provider computing system 110 can identify that the user has a knowledge of CDs based on the CD investment from the user profile. More specifically, the provider computing system 110 can identify that the user has a preference towards low-risk investments, based on the 13-month CD, and that the user may not have a large portion of income to invest based on the outstanding student loans. Upon identifying that the user tends towards low-risk investments and that the user may not have as much income to put at risk in light of the outstanding student loans, the provider computing system 110, via a user interface generated by the client application 145, asks/prompts the user to select the scenario with the lowest risk: (1) invest £1,000 in a government bond; (2) invest £1,000 in an index fund; (3) invest £1,000 in the fastest growing stock on the market; or (4) invest £1,000 in cryptocurrency. The user selects one of the scenarios and, based on the selection, the provider computing system 110 may assess whether the user selected the scenario with the lowest risk. If the user selects the incorrect answer, the provider computing system 110 may update the user knowledge dataset to indicate that the user does not know the risks associated with different investment options.

The AI system 120 may generate and present additional prompts that gradually teach the user about investment options so that the user can learn, based on their own financial data, how to invest. For example, if the user responded to the previous prompt incorrectly, the AI system 120 may generate an additional prompt asking the user to choose the lower risk investment among the choices of the treasury bond or the index fund. Alternatively, the AI system 120 may generate an additional prompt presenting four different scenarios that comprise paying off the outstanding student loans at different rates. The additional prompt may demonstrate the impact of each scenario on the user’s financial data and may ask the user to select the scenario that can save the most money on interest rates while still allowing the user to invest 20% of their monthly income. The AI system 120 may be configured to continue generating additional prompts relating to the topic until the user reaches the predefined level of competency relating to the topic, as described above in relation to iterative process 1324. In this stock investment-related example, the AI system 120 may be configured to generate additional prompts until the familiarity of the user with the topic of investments as stored in the knowledge dataset 166 matches the general knowledge relating to investments and until the average score of the user responses to the investment-related prompts exceeds 6 (on a 10-point scale).

Figure 4:
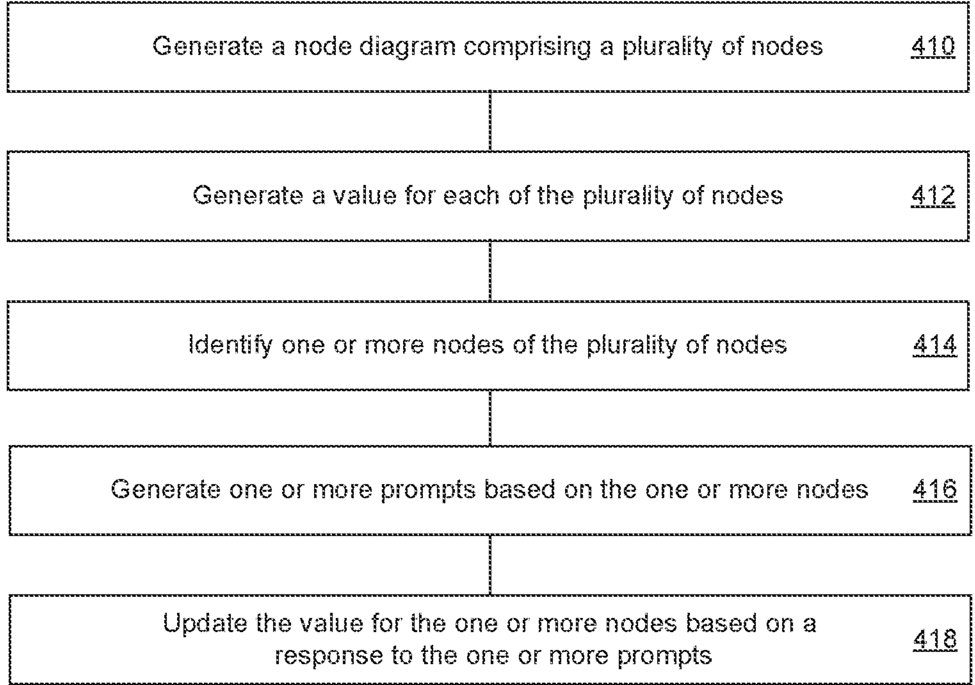
FIG. 4 depicts additional steps of the method of FIG. 3, according to an example embodiment.

FIG. 4 depicts additional steps (e.g., method 400) to the method 300 for learning from the AI system 120 of the provider computing system 110, according to some embodiments. Various components and/or systems of the provider computing system 110 can perform the method 400.

At 410, a node diagram is generated. The node diagram refers to an array of interconnected datapoints (e.g., nodes), the array comprising a representation of a user’s knowledge (e.g., the knowledge dataset generated at 318). The node diagram may comprise a plurality of nodes. Each of the plurality of nodes represents a secondary topic that is associated with or otherwise related to a primary topic regarding the query of the user. In some embodiments, the node diagram may be generated by the knowledge processor 154 of the provider computing system 110. In some embodiments, the secondary topic represented by each of the plurality of nodes may be retrieved from topic database 162. In some embodiments, processing circuitry 150 may be configured to generate data corresponding to the node diagram. The data corresponding to the node diagram may comprise a graphical representation of the node diagram configured to be displayed on a user interface (e.g., a graphical user interface (GUI) of the client computing device 140).

At process 412, a value is generated for each of the plurality of nodes. In some embodiments, the AI system 120 may be configured to generate the value for each of plurality of nodes. The value may be expressed as a numerical value on a scale, a percentage value, or other indicator regarding an assessed or determined knowledge of a user. For example, the scale may be 0-to-100, where values closer to 100 indicate a greater determined knowledge of the user. In some embodiments, the graphical representation of the node diagram generated at 410 may further comprise one or more elements corresponding to the value for each of the plurality of nodes. For example, a value of 10 may be represented by red shape, while the value of 90 may be represented by a green shape.

At process 414, one or more nodes of the plurality of nodes are identified. In some embodiments, the one or more nodes are identified by the AI system 120. The one or more nodes may be identified according to a predefined threshold applied to the value generated for each of the plurality of nodes at process 412. The predefined threshold represents a value of sufficient knowledge on the topic. In some embodiments, the value of sufficient knowledge may be determined based on a general knowledge (e.g., the general knowledge stored in the knowledge dataset 166) of the topic. In some embodiments, the value of sufficient knowledge may be determined based on a user-entered goal (e.g., "I want to learn how to calculate derivatives"). For each of the plurality of nodes with a value less than the predefined threshold, the AI system 120 may indicate an insufficient knowledge of the secondary topic represented by that node.

At process 416, one or more prompts are generated based on the one or more nodes identified at process 414. In some embodiments, the one or more prompts are generated by the AI system 120. The one or more prompts generated at process 416 may comprise the one or more prompts generated at process 320 of method 300, for example. The one or more prompts generated at process 416 may be configured to improve the user knowledge of the secondary topic represented by the one or more nodes identified at process 414. In some embodiments, the one or more prompts may comprise a question or a hypothetical scenario. The one or more prompts may further comprise one or more interactive elements (e.g., a selectable element, a free-text box, etc.) displayed on a user interface of the client computing device 140.

In some embodiments, the AI system 120 may be trained to identify a correct response to the one or more prompts. For example, the AI system 120 may be trained to identify an expected return on a variety of investment strategies. Therefore, to a prompt that presents four possible investment strategies and asks the user to select the investment strategy with the highest return, the AI system 120 may identify the investment strategy with the highest return as the correct response. In some embodiments, the AI system 120 may be trained to construct a sample response to the one or more prompts. For example, the AI system 120 may devise a sample investment portfolio that may be used as a sample response to a prompt that asks the user to create an investment portfolio.

At process 418, the value for the one or more nodes identified at 414 is updated based on a response to the one or more prompts generated at 416. The AI system 120 may be configured to update the value for the one or more nodes. The response to the one or more prompts may be submitted by a user via a user interface of the client computing device 140. In some embodiments, submitting the response may comprise engaging with the one or more interactive elements of 416 (e.g., choosing one selectable element from an array of selectable elements, entering a response into a free-text box, etc.). The one or more interactive elements of 416 may be generated by the client application 145 for display via the user interface. In some embodiments, the AI system 120 may identify the response as the correct response (e.g., the correct response identified by the AI system at 416) to the one or more prompts or as an incorrect response to the one or more prompts. If the response comprises the correct response, for example, the AI system 120 may be configured to increase the value for the one or more nodes identified at 414.

Figure 5:
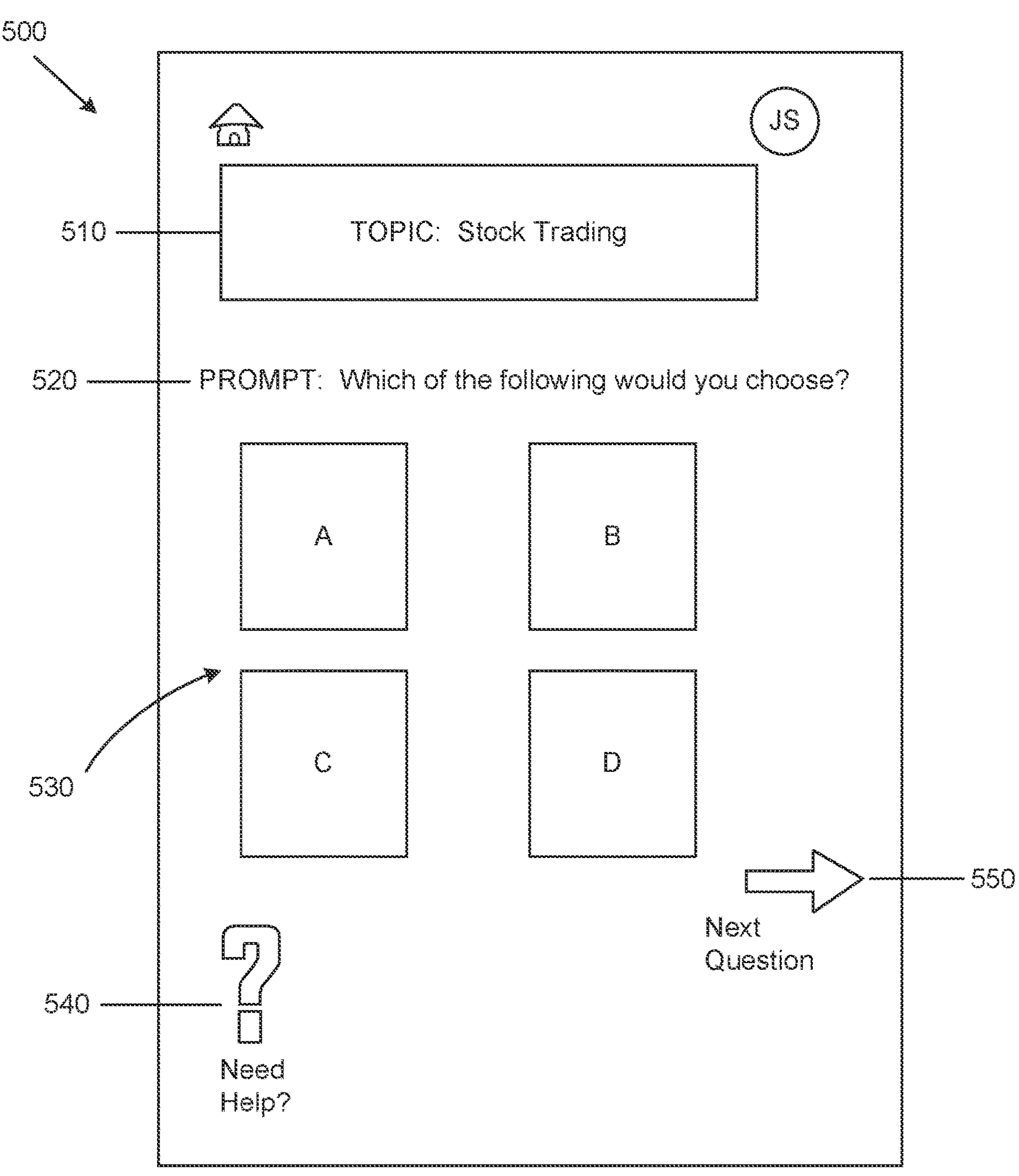
FIG. 5 depicts a user interface, according to an example embodiment.

FIG. 5 depicts a user interface 500, according to an example embodiment. The user interface 500 may be generated by the client application 145 and may be displayed on a display device (e.g., display device 144) of a client computing device (e.g., client computing device 140). In some embodiments, the user interface 500 may be accessed by a web-browser, wherein the user interface 500 is generated and provided by the provider institution. The user interface 500 may depict a topic 510 (e.g., stock trading) that relates to an input (e.g., a query, etc.) from a user to a computing system (e.g., provider computing system 110). The user interface 500 may further comprise a prompt 520 (e.g., the one or more prompts determined at 320, the one or more prompts generated at 416, etc.). For example, the prompt 520 may present various scenarios 530 (e.g., scenario A, scenario B, scenario C, scenario D, etc.), wherein the various scenarios 530 each comprise a potential stock trade, and ask the user to select one of the various scenarios 530. Each of the various scenarios 530 may comprise one or more first selectable elements. In some embodiments, the AI system 120 may identify one of the various scenarios 530 as a correct response. (e.g., the correct response to the one or more prompts generated at 416). The user interface 500 may further comprise a second selectable element configured to provide additional information to the user (e.g., stock knowledge from the general knowledge stored in the knowledge dataset 166). In some embodiments, the second selectable may be depicted by a question mark. The user interface 500 may further comprise a third selectable element configured to allow a user to proceed to a different prompt 520. The third selectable element may be depicted by an arrow, "Next Question," etc.

Figure 6:
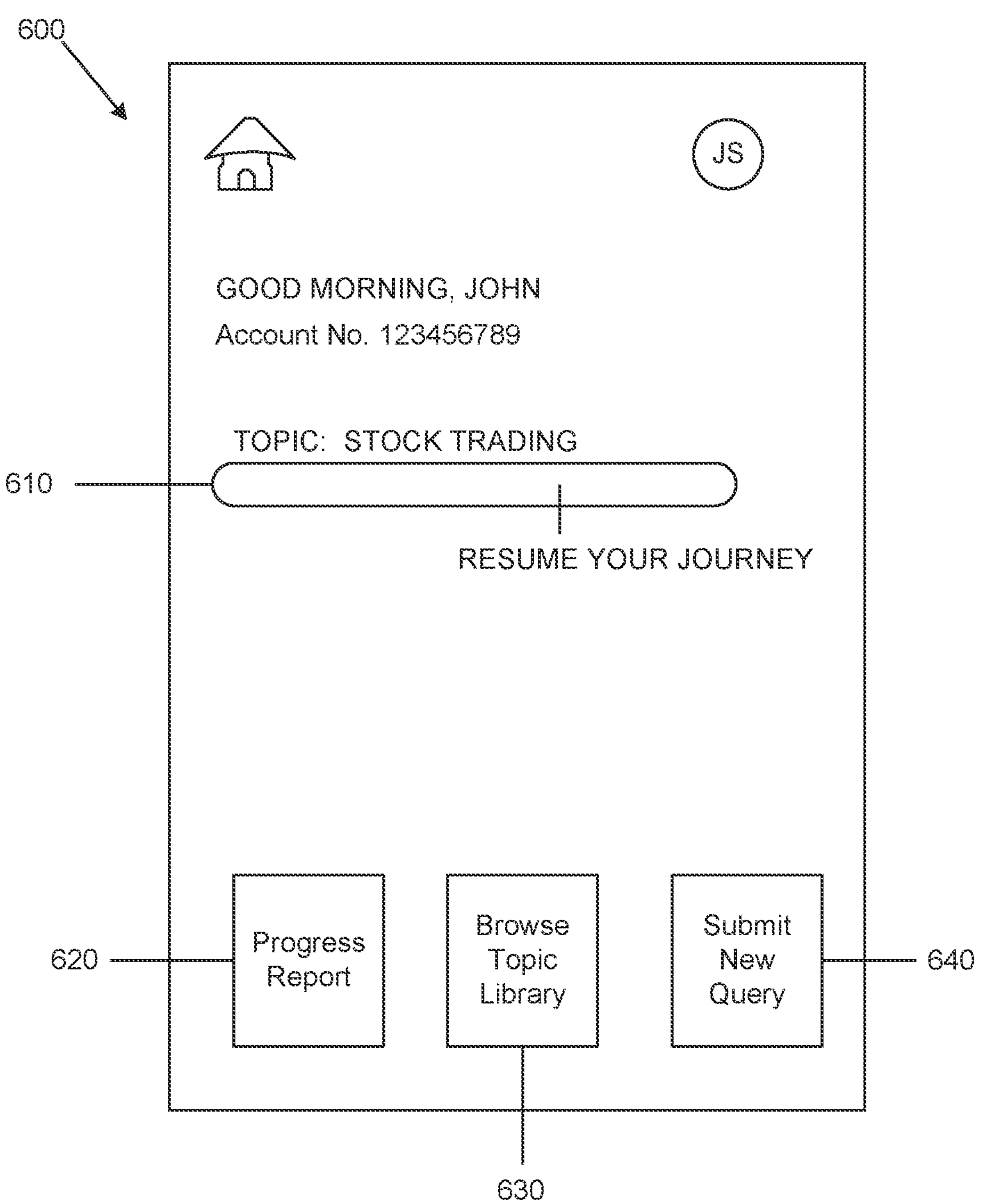
FIG. 6 depicts another user interface, according to an example embodiment.

FIG. 6 depicts another user interface, user interface 600, according to an example embodiment. The user interface 500 may be generated by the client application 145 and may be displayed on a display device (e.g., display device 144) of the client computing device 140. In some embodiments, the user interface 500 may be accessed by a web-browser, wherein the user interface 500 is generated and provided by the provider institution. User interface 600 may comprise a home page of a client application (e.g., client application 145). In some embodiments, user interface 600 may comprise a first selectable element 610 configured to present an option for a user to continue a previous learning session. For example, the first selectable element 610 may be configured to resume teaching the user about a topic from a previous user query (e.g., stock trading). In some embodiments, the first selectable element 610 may depict a progress bar to indicate the progress the user has made in learning about the topic. For example, the progress bar may be generated by the knowledge processor 154 using information from the system memory 160 (e.g., the knowledge dataset 166, the response bank 168, etc.).

The user interface 600 may further comprise a second selectable element 620 configured to display a progress report associated with a user profile of the user. The progress report may comprise information retrieved from the system memory 160 (e.g., the user profile 164, the knowledge dataset 166, the response bank 168, etc.). In some embodiments, the progress report may comprise metrics associated with each of a plurality of topics, the plurality of topics each relating to one or more past user queries. The user interface 600 may further comprise a third selectable element 630 configured to allow the user to browse a topic library. For example, if the user does not have a specific query or a particular topic in mind, they can view an array of possible topics that the AI system 120 can teach. The user interface may further comprise a fourth selectable element 640. The fourth selectable element 640 may allow a user to submit a new query. In some embodiments, upon receiving a selection of the fourth selectable element 640, the client computing device may present pop-up window via the user interface 600, the pop-up window comprising a free-text box where the user may submit the new query.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud-based server). To that end, a "circuit" as described herein may include components that are distributed across one or more locations.

An exemplary system for implementing the overall system or portions of the embodiments might include a one or more computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A provider computing system comprising:

at least one processing circuit having at least one processor coupled to at least one memory device, the at least one memory device storing instructions thereon that, when executed by the at least one processor, cause the at least one processing circuit to perform operations comprising:

retrieving first data from one or more data sources, wherein the first data comprises information associated with a user;

generating a model associated with the user based on the first data; and receiving, from a client computing device of the user, a query for information relating to a primary topic;

at least one artificial intelligence (AI) system, the at least one AI system configured to perform operations comprising:

generating a user knowledge dataset relating to the primary topic, wherein the user knowledge dataset comprises a node diagram associated with the primary topic, the node diagram comprising a plurality of nodes representative of secondary topics related to the primary topic;

identifying one or more nodes of the plurality of nodes;

determining one or more prompts according to the user knowledge dataset and based on the one or more nodes;

presenting, via a user interface of the client computing device, the one or more prompts to the user; and receiving, via the user interface of the client computing device, a response to the one or more prompts from the user.

2. The provider computing system of claim 1, wherein the at least one AI system is further configured to perform operations comprising:

generating a value for each of the plurality of nodes based on an evaluation of the user knowledge dataset.

3. The provider computing system of claim 2, wherein the evaluation of the user knowledge dataset is based on a comparison of the user knowledge dataset to a general knowledge dataset.

4. The provider computing system of claim 2, wherein the at least one AI system is further configured to perform operations comprising:

updating the value for the one or more nodes according to the response to the one or more prompts.

5. The provider computing system of claim 1, wherein the at least one processing circuit is further configured to perform operations comprising:

generating one or more additional prompts based on the node diagram for display by the client computing device;

transmitting, to the client computing device, the one or more additional prompts; and causing the client computing device to render the user interface, the user interface comprising a graphical representation of the node diagram.

6. The provider computing system of claim 5, wherein the graphical representation of the node diagram comprises one or more elements corresponding to a value for each of the plurality of nodes, and wherein the at least one processing circuit is further configured to perform operations comprising:

updating, responsive to a receipt of the response to the one or more additional prompts, at least one element of the one or more elements, wherein the updated at least one element indicates a change in the value of the node corresponding to the at least one element.

7. The provider computing system of claim 1, wherein the at least one AI system is further configured to perform operations comprising:

generating a challenge question in response to the query, the challenge question relating to the primary topic; and receiving, via the user interface of the client computing device, a response to the challenge question.

8. The provider computing system of claim 1, wherein the at least one AI system comprises a generative AI model.

9. The provider computing system of claim 1, wherein the one or more prompts comprise at least one of an audio prompt, a text-based prompt, or a video prompt.

10. A method comprising:

retrieving, by one or more processors of a provider computing system, first data from one or more data sources, wherein the first data comprises information associated with a user;

receiving, by the one or more processors of the provider computing system from a client computing device of the user, a query for information relating to a primary topic;

generating, by at least one artificial intelligence (AI) system of the provider computing system, a user knowledge dataset relating to the primary topic, wherein the user knowledge dataset comprises a node diagram associated with the primary topic, the node diagram comprising a plurality of nodes representative of secondary topics related to the primary topic;

identifying, by the at least one AI system, one or more nodes of the plurality of nodes;

determining, by the at least one AI system, one or more prompts according to the user knowledge dataset and based on the one or more nodes;

causing, by the one or more processors of the provider computing system, a presentation of a user interface via the client computing device of the one or more prompts; and receiving, by the one or more processors of the provider computing system via the user interface of the client computing device, a response to the one or more prompts from the user.

11. The method of claim 10, further comprising:

generating, by the at least one AI system of the provider computing system, a value for each of the plurality of nodes based on an evaluation of the user knowledge dataset.

12. The method of claim 11, wherein the evaluation of the user knowledge dataset is based on a comparison of the user knowledge dataset to a general knowledge dataset.

13. The method of claim 11, further comprising:

updating, by the at least one AI system of the provider computing system, the value for the one or more nodes according to the response to the one or more prompts.

14. The method of claim 10, further comprising:

generating, by the one or more processors of the provider computing system, one or more additional prompts based on the node diagram for display at the client computing device;

transmitting, by the one or more processors of the provider computing system to the client computing device, the one or more additional prompts; and causing, by the one or more processors of the provider computing system, the client computing device to render the user interface, the user interface comprising a graphical representation of the node diagram.

15. The method of claim 14, wherein the graphical representation of the node diagram comprises one or more elements corresponding to a value for each of the plurality of nodes, the method further comprising:

updating, by the one or more processors of the provider computing system and responsive to a receipt of the response to the one or more additional prompts, at least one element of the one or more elements to indicate a change in the value for the node corresponding to the at least one element.

16. The method of claim 10, further comprising:

generating, by the at least one AI system of the provider computing system, a challenge question in response to the query and relating to the primary topic; and receiving, by the one or more processors of the provider computing system, a response to the challenge question.

17. The method of claim 10, wherein the at least one AI system comprises a generative AI model.

18. A non-transitory computer readable medium including instructions stored thereon that, when executed by one or more processors, cause the one or more processors to perform operations comprising:

retrieving first data from one or more data sources, wherein the first data comprises information associated with a user;

receiving, from a client computing device of the user, a query for information relating to a primary topic;

generating, by at least one artificial intelligence (AI) system, a user knowledge dataset relating to the primary topic, wherein the user knowledge dataset comprises a node diagram associated with the primary topic, the node diagram comprising a plurality of nodes representative of secondary topics related to the primary topic;

identifying, by the at least one AI system, one or more nodes of the plurality of nodes;

determining, by the at least one AI system, one or more prompts according to the user knowledge dataset and based on the one or more nodes;

causing a presentation of a user interface by the client computing device, the presentation comprising the one or more prompts; and receiving a response to the one or more prompts.

* * * * *